(12) United States Patent
Gregerson

(10) Patent No.: US 8,240,570 B2
(45) Date of Patent: Aug. 14, 2012

(54) HYBRID IMAGING OPTICAL CODE READER

(75) Inventor: Dave Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 16 days.

(21) Appl. No.: 12/962,683

(22) Filed: Dec. 8, 2010

(65) Prior Publication Data

US 2012/0145791 A1    Jun. 14, 2012

(51) Int. Cl.
*G06K 7/10* (2006.01)
*G06K 7/14* (2006.01)
*G02B 5/08* (2006.01)
*G02B 26/00* (2006.01)

(52) U.S. Cl. .................. 235/462.01; 235/454; 235/470; 235/462.36

(58) Field of Classification Search .................. 235/470, 235/462.01, 379–381, 435, 454, 378, 462.36
See application file for complete search history.

(56) References Cited

U.S. PATENT DOCUMENTS

| | | | | |
|---|---|---|---|---|
| 4,914,280 A * | 4/1990 | Peterson | ................... | 235/462.49 |
| 5,198,650 A * | 3/1993 | Wike, Jr. | ................... | 235/462.45 |
| 5,214,270 A * | 5/1993 | Rando | ....................... | 235/462.36 |
| 5,314,631 A * | 5/1994 | Katoh et al. | ............... | 235/462.4 |
| 5,691,528 A * | 11/1997 | Wyatt et al. | .............. | 235/462.07 |
| 5,691,834 A * | 11/1997 | Plesko | ........................ | 359/202.1 |
| 5,804,807 A * | 9/1998 | Murrah et al. | ................ | 235/383 |
| 5,978,772 A * | 11/1999 | Mold | .............................. | 705/16 |
| 6,164,546 A * | 12/2000 | Kumagai et al. | ......... | 235/472.01 |
| 6,325,290 B1 * | 12/2001 | Walter et al. | ............. | 235/472.01 |
| 6,435,413 B1 * | 8/2002 | Kumagai et al. | ......... | 235/462.45 |
| 6,575,368 B1 * | 6/2003 | Tamburrini et al. | ..... | 235/462.25 |
| 6,719,201 B2 * | 4/2004 | Tamburrini et al. | ..... | 235/462.07 |
| 7,051,940 B2 * | 5/2006 | Tamburrini et al. | ....... | 235/462.4 |
| 7,611,061 B2 * | 11/2009 | Steele et al. | ................ | 235/462.3 |
| 2001/0038037 A1 * | 11/2001 | Bridgelall et al. | ....... | 235/462.14 |
| 2002/0195497 A1 * | 12/2002 | Kumagai et al. | ......... | 235/472.01 |
| 2003/0030925 A1 * | 2/2003 | Suzuki et al. | ................. | 359/877 |
| 2003/0052173 A1 * | 3/2003 | Good | ........................ | 235/462.32 |
| 2003/0136843 A1 * | 7/2003 | Ralph et al. | ............. | 235/462.33 |
| 2003/0155418 A1 * | 8/2003 | Daugs et al. | ................... | 235/383 |
| 2003/0178492 A1 * | 9/2003 | Tamburrini et al. | ..... | 235/472.01 |
| 2003/0201329 A1 * | 10/2003 | Kumagai et al. | ......... | 235/462.32 |
| 2008/0179402 A1 * | 7/2008 | Barkan et al. | ............. | 235/462.41 |
| 2009/0272801 A1 * | 11/2009 | Connell et al. | ................ | 235/383 |
| 2010/0051695 A1 * | 3/2010 | Yepez et al. | ............. | 235/462.32 |
| 2010/0065631 A1 * | 3/2010 | Orlewski | ....................... | 235/383 |
| 2012/0007738 A1 * | 1/2012 | Barkan et al. | ................. | 340/540 |
| 2012/0074218 A1 * | 3/2012 | Walsh | ........................... | 235/380 |

\* cited by examiner

*Primary Examiner* — Daniel Walsh
(74) *Attorney, Agent, or Firm* — Harden E. Stevens, III; Paul W. Martin

(57) ABSTRACT

A wireless hybrid imaging optical code reader is operable in both handheld and fixed configurations, the fixed configuration corresponding to the imaging optical code reader being mounted upon a fixed laser optical code scanner. The imaging optical code reader comprises first and second imaging windows and an optical element which allows light from only one of the imaging windows to be incident upon an imaging device of the imaging optical code reader dependent upon whether the imaging optical code reader is being used in the hand held or fixed configuration.

20 Claims, 4 Drawing Sheets

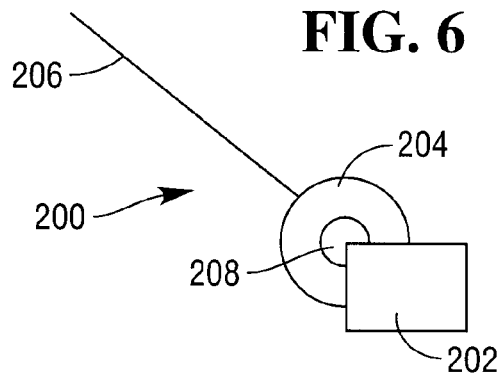
FIG. 6
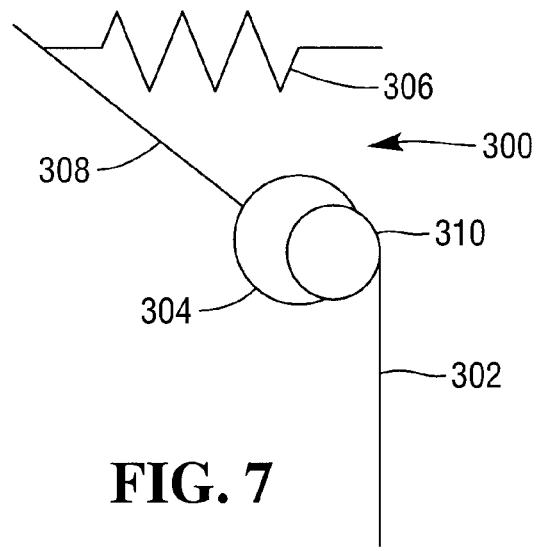
FIG. 7
```
┌─ 400
│ ENGAGE AN OPTICALLY ACTIVE ELEMENT TO ALLOW
│ LIGHT PASSING THROUGH A FIRST WINDOW TO BE
│ INCIDENT UP AN IMAGE CAPTURE DEVICE IN THE
│ HAND-HELD CONFIGURATION AND TO ALLOW LIGHT
│ PASSING THROUGH A SECOND WINDOW TO BE
│ INCIDENT UPON THE IMAGE CAPTURE DEVICE IN THE
│ FIXED CONFIGURATION
```
FIG. 8

HYBRID IMAGING OPTICAL CODE READER

FIELD OF THE INVENTION

This invention relates a hybrid imaging optical code reader. More particularly, but not exclusively, it relates to a hybrid imaging optical code reader operable in both hand held and fixed configurations.

BACKGROUND TO THE INVENTION

Checkout terminals use stationary barcode scanners, which can be mono-optic, a single scanner typically mounted in the horizontal direction, or bi-optic, typically mutually orthogonal scanners mounted in the horizontal and vertical directions respectively. However, imaging scanners are useful for the reading of two-dimensional barcodes and where a smaller than standard barcode is applied to an item. Imaging scanners are also useful where product recognition of non-barcoded items, for example fruit and vegetables, is required and also where barcodes cannot be scanned, for example where the barcode applied to an item is damaged, an image of the barcode can be analysed.

There is a desire to improve the ergonomic efficiency of imaging scanners and also to reduce the footprint of the area of the scanning portion of the retail checkout.

The ergonomic efficiency of the imaging scanners leads to greater throughput of items through the retail checkout leading to shorter customer queuing times and greater customer satisfaction. Also, ergonomic design leads to reduced operator fatigue and fewer operator injuries, for example repetitive strain injuries.

A reduction in the footprint of the scanning portion of the retail checkout leads to a reduced footprint of the overall retail checkout which is clearly desirable for retailers where floorspace is at a premium.

Handheld scanners barcode scanners suffer from the problem that they are configured only for handheld scanning and cannot be readily integrated with stationary barcode scanners to compliment their operation as the optical path required for handheld use is fundamentally different from that required to operate in conjunction with stationary barcode scanners.

SUMMARY OF THE INVENTION

According to a first aspect of the present invention there is provided an imaging optical code reader operable in both handheld and fixed configurations comprising:
an image capture device;
first and second windows;
an optically active element arranged to allow light passing through the first window to be incident upon the image capture device in the handheld configuration and being further arranged to allow light passing through the second window to be incident upon the image capture device in the fixed configuration.

It will be appreciated that the term optically active element as used herein refers to any optical element which alters the path of light incident thereupon.

The optically active element may be arranged to move between first and second positions.

In the first position the optically active element may be arranged to direct light passing through the first window on to the image capture device and in the second position the optically active element may be arranged to direct light passing through the second window on to the image capture device.

In the first position the optically active element may be arranged to direct light passing through the first window on to the image capture device in the handheld configuration and in the second position the optically active element may be arranged to lie out of the path of light passing through the first window in the fixed configuration thereby allowing light passing through the second window to be incident upon the image capture device, or vice versa.

The optically active element may be arranged to move between said first and second positions by a biasing mechanism.

The biasing mechanism may comprise a spring arranged to bias the optically active element to the first position. The biasing mechanism may comprise a first magnet located in a body of the imaging optical code reader and a complimentary second magnet located in a receiving portion of scanning station which is arranged to receive the imaging optical code reader. The first and second magnets may be arranged to cooperate to bias the optically active element to the second position.

The biasing mechanism may comprise a drive arrangement comprising an arm extending longitudinally along a channel in a side wall of the imaging optical code reader and a shaft coupled to both the arm and the optically active element. An end of the arm, remote from the shaft, may be arranged to cooperate with a projection from a receiving portion of a scanning station to drive the shaft, and consequently optically active element from the first position to the second position. The drive arrangement may comprise a spring arranged to bias the optically active element to the first position.

The biasing mechanism may comprise a motor arranged to drive the optically active element between the first and second positions. The motor may be arranged to drive the optically active element between the first and second positions in response to a signal indicative of the imaging optical code reader being located in a receiving portion of a scanning station, and vice versa. The biasing mechanism may be driven by gravity dependent on the docking orientation of the imaging optical reader.

The optically active element may comprise a mirror. The optically active element may comprise a transparent polyhedron having at least one mirrored surface. The mirror may be arranged to rotate or translate to change the optical path observed by the image capture device.

The optically active element may comprise an electrically activated element arranged to change from transmissive to reflective, or vice versa, upon the application of a voltage. The electrically activated element may be 95% reflective, or better, in a first arrangement and 95% transmissive, or better, in a second arrangement.

The first and second windows may be mutually orthogonal. The first window may comprise an end window of the imaging optical code reader. The second window may comprise a side window of the imaging optical code reader. The side window of the imaging optical code reader may be arranged to interface with an interface window of a fixed optical code scanner. The fixed optical code scanner may comprise a laser scanner, for example a barcode scanner.

The imaging optical code reader may comprise a processor arranged to receive an output from the image capture device. The imaging optical code reader may comprise a wireless transceiver. The wireless transceiver may utilise any one of the following data transmission techniques: Bluetooth, NFC, RFID.

The imaging optical code reader may comprise a rechargeable power source. The imaging optical code reader may comprise a charging connector arranged to receive power from a complimentary charging connector of a receiving portion of a scanning station and is further arranged to supply this power to the rechargeable power supply.

According to a second aspect of the present invention there is provided a scanning station comprising a fixed optical code scanner and a receiving portion arranged to receive an imaging optical code reader according to the first aspect of the present invention.

The receiving portion may comprise a magnet arranged to cooperate with a complimentary magnet located on the imaging optical code reader.

The receiving portion may comprise a projection arranged to engage with an arm of a drive arrangement of the imaging optical code reader.

The receiving portion may be arranged to retain the imaging optical code reader such that the second window of the imaging optical code reader is directed towards a scan volume of the fixed optical code scanner. The receiving portion may be arranged to align the second window with an opening in a housing of the fixed optical scanner, and the opening lies in an optical path between the second window and a window of the fixed optical code scanner. The fixed optical code scanner may comprise an imaging mirror in the optical path and arranged to direct light passing through the window of the fixed optical scanner through the opening and the second window.

The receiving portion may comprise a charging connector arranged to supply power to a complimentary charging connector of the imaging optical code reader.

The optical code scanning station may comprise a wireless transceiver arranged to communicate with the transceiver of the imaging optical code reader.

According to a third aspect of the present invention there is provided a method of operating an imaging optical code reader in a handheld configuration and in a fixed configuration comprising:
engaging an optically active element to allow light passing through a first window to be incident up an image capture device in the hand-held configuration and to allow light passing through a second window to be incident upon the image capture device in the fixed configuration.

The method may comprise moving the optically active element between first and second positions.

The method may comprise directing light passing through the first window to the image capture device by the optically active element and in the second position directing light passing through the second window on to the image capture device by the optically active element.

The method may comprise directing light passing through the first window on to the image capture device in the hand-held configuration by the optically active element and in the second position the optically element lies out of the path of light passing through the first window in the fixed configuration thereby allowing light passing through the second window to be incident upon the image capture device, or vice versa.

The method may comprise biasing the optically active element between the first and second positions.

The method may comprise biasing the optically active element to the first position by a spring. The method may comprise biasing the optically active element to the second position by a first magnet located in the imaging optical code reader and a second magnet in a receiving portion of a scanning station cooperating.

The method may comprise driving a shaft coupled to both an arm and the optically active element by an end of the arm, remote from the shaft engaging with a projection from a receiving portion of a scanning station to bias the optically active element to the second position. The method may comprise biasing the optically active element to the first position by a spring.

The method may comprise driving the optically active element between the first and second positions by a motor, and vice versa. The method may comprise driving said motor in response to a signal indicative of the imaging optical code reader being located in a receiving portion of a scanning station, and vice versa.

The optically active element may comprise a mirror. The optically active element may comprise a transparent polyhedron having at least one mirrored surface.

The first and second windows may be mutually orthogonal.

The method may comprise transmitting data indicative of an output from the image capture device via a wireless transceiver. The wireless transceiver may utilise any one of the following data transmission techniques: Bluetooth, NFC, RFID.

The method may comprise receiving power from a complimentary charging connector of a receiving portion of a scanning station to charge a rechargeable power source of the imaging optical code reader.

BRIEF DESCRIPTION OF THE DRAWINGS

The invention will now be described, by way of example only, with reference to the accompanying drawings, in which:

FIG. 6 is an alternative embodiment of a beam deflector mechanism of the imaging code reader of FIG. 2;

FIG. 7 is a still further alternative embodiment of a beam deflector mechanism of the imaging code reader of FIG. 2; and FIG. 8 is a flowchart showing steps of a method of operating an imaging scanner in a hand-held configuration and in a fixed configuration.

DETAILED DESCRIPTION OF PREFERRED EMBODIMENTS

Figure 1:
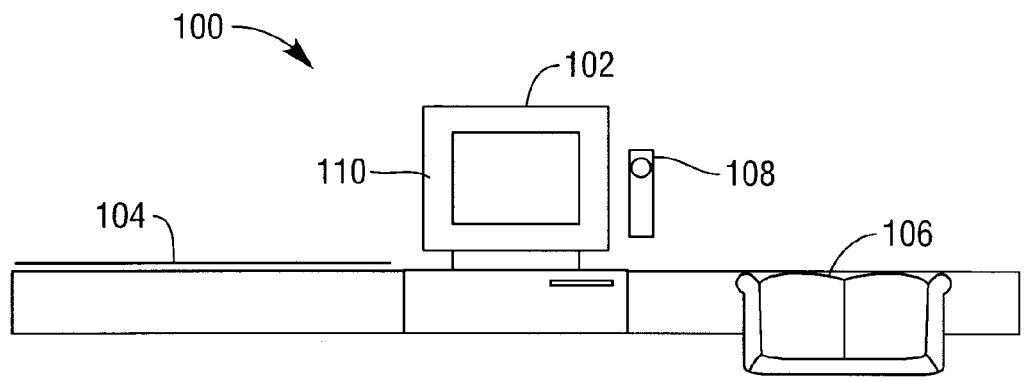
FIG. 1 is a perspective view of a retail checkout terminal comprising an embodiment of imaging optical code reader according to an aspect of the present invention.

Referring to FIG. 1, a retail checkout terminal 100 comprises a scanning station 102, a belt drive 104 and a bagging station 106.

The scanning station 102 comprises a detachable hybrid image optical code reader 108 and a fixed barcode scanner 110. The detachable hybrid image optical code reader 108 is operable in either a hand held configuration, hereinafter referred to as a first configuration, and a fixed configuration where the image optical code reader 108 is received in scanning station, hereinafter referred to as a second configuration.

Figure 2:
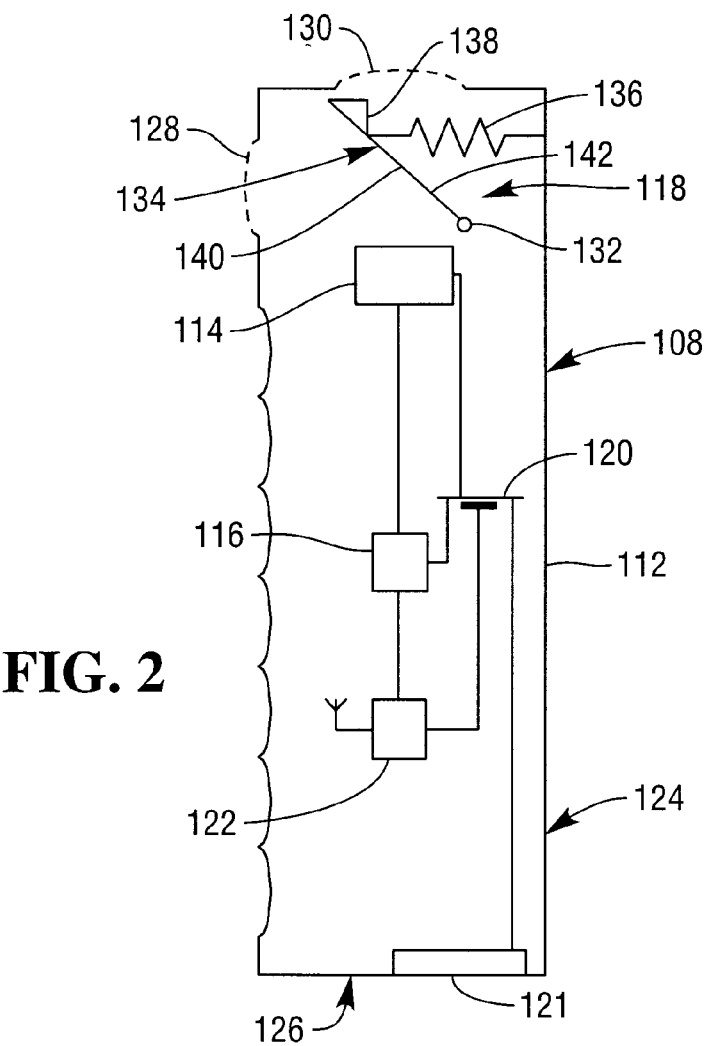
FIG. 2 is a schematic diagram showing components and a housing of an embodiment of an imaging optical code reader according to an aspect of the present invention.

Referring now to FIG. 2, the imaging optical code reader 108 comprises an elongate housing 112, an image capture device 114, typically a CMOS imaging array, a processor 116, a beam deflector mechanism 118, a rechargeable power supply 120, a charging connector 121 and a wireless transceiver 122, typically utilising.

The housing 112 comprises four rectangular side walls 124 and two end faces 126. One of the side walls 124 and one end face 126 of the housing have respective windows 128, 130 passing through them. The window 128 is located adjacent to the end face 126 such that the windows 128, 130 are adjacent each other and mutually perpendicular.

In the present embodiment, the beam deflector mechanism 118 comprises a pivot shaft 132, a plane mirror 134, a spring 136 and a magnet 138. The mirror 134 comprises a reflective surface 140 and a non-reflective surface 142. The magnet 138 is attached to the non-reflective surface 142 of the mirror 134. The pivot shaft 132 runs along a lower edge of the mirror 134 and locates in bearing recesses in the side walls 124 which are perpendicular to the window 128.

In the first configuration, the spring 136 connects to an upper edge of the non-reflective surface 142 of the mirror 134 and to the side wall 124 adjacent the window 128 and biases the mirror 134 such that it pivots away from the window 128 about the pivot shaft 132, such that light entering from the window 130 is passes parallel to the longitudinal axis of the housing 112. In this configuration, light entering from the window 128 is not directed down the housing 112 by the mirror 134.

Light passing from the window 130 down the housing 112 is incident upon the image capture device 114 such that an image of the field of view defined by the window 130 can be captured.

In the second configuration, an external magnet opposes the magnet attached to the non-reflective surface 142 of the mirror 134 overcoming the bias of the spring 136 and forcing the mirror 134 to pivot towards the window 128. Thus, light entering the housing 112 via the window 130 is blocked from impinging upon the image capture device and light entering the housing via the window 128 is reflected parallel to the longitudinal axis of the housing 112 resulting in a field of view defined by the window 128 being imaged on the image capture device 114. In this configuration the hybrid code reader 108 can communicate with the scanning station 102 either wirelessly or via a wired connection and dependent upon the preferred operation mode a wired connection is provided when the code reader 108 is in the receiving station.

Data corresponding to the image capture device 114 is passed to the processor 116 and then on to the wireless transceiver 122 when the imaging optical code reader 108 is in the first configuration and also preferably when it is in the second configuration. The wireless transceiver 122 transmits the data to a remote station, typically a wireless transceiver in the scanning station 102, where it is processed to extract information from the image data. The information extracted from the image data may comprise, but is not limited to, barcode information or two dimensional barcode information which identifies a product associated with the barcode. Alternatively or additionally, but not exclusively, the information extracted may be product recognition data, for example identifying an item of fresh produce such as a banana or a melon.

It will be appreciated that, the second window of the imaging scanner can also direct the imaging optical path directly outwards toward the retail operator so that barcodes can be read directly from the docked imaging scanner. In this configuration the optical path of the imaging scanner does not pass through the housing of the fixed scanner.

It will be appreciated that although described with reference to a plane mirror a transparent polyhedron with at least one mirrored surface can be used such that the rotation of the polyhedron rotates the mirrored surface into and out of the path of light passing through the window 118.

Figure 3:
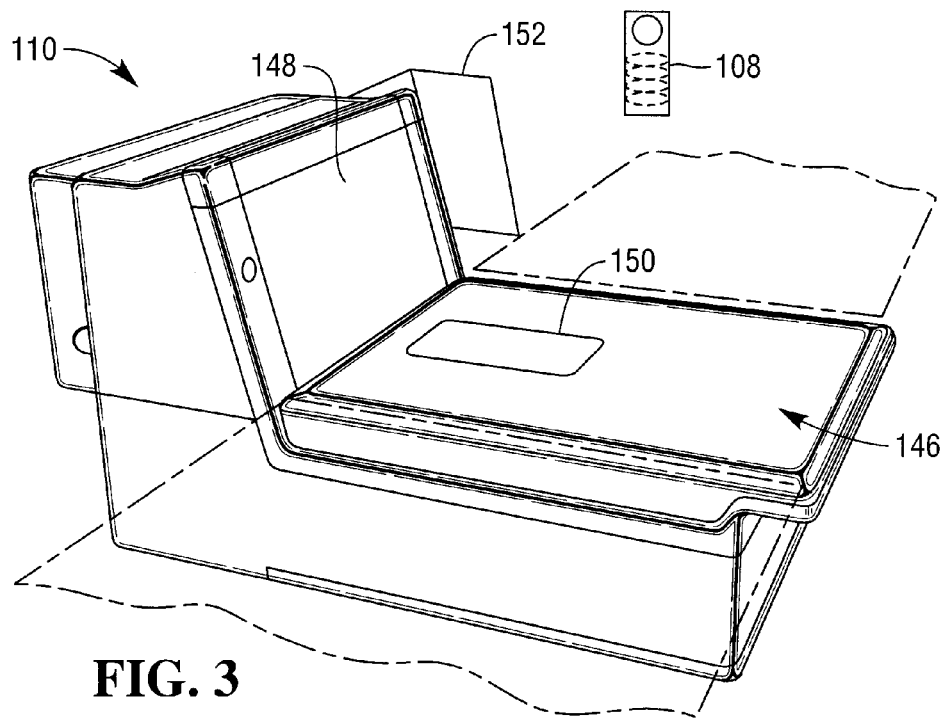
FIG. 3 is a perspective view of a first embodiment of a scanning station arranged to received the imaging optical code reader of FIG. 2.

Referring now to FIG. 3, the barcode scanner 110 comprises a bioptic optical code scanner 146, typically a laser barcode scanner. The construction and operation of a bioptic barcode scanner is described in U.S. Pat. No. 5,229,588 the contents of which are incorporated herein by reference. The bioptic scanner 146 of the present embodiment comprises a vertical window 148 and a horizontal window 150, each of which encompass a scan volume of the bioptic scanner 146, within which an optical code, typically a barcode, on an object can be scanned.

The scanning station 102 comprises a receiving cradle 152 adjacent the vertical window 148 into which the imaging optical code reader 108 sits. The receiving cradle 152 comprises a recess 154 in the scanning station 102 which retains the imaging optical code reader 108 in the second configuration. The receiving cradle 152 comprises a charging connector which is complimentary to the charging connector 121 of the imaging optical code reader 108. The rechargeable power supply 120 of the imaging optical code reader 108 draws power from a power supply of the scanning station 102 to recharges the power supply 120 when the imaging optical code reader 108 is retained in the receiving cradle 152.

When retained in the second configuration the imaging optical code reader 108 has the window 118 directed at the scan volume of the scanner 146. In this way the imaging optical code reader 108 samples a volume comprising at least part of the scan volume, such that an object passing through the scan volume of the bioptic scanner 146 can be imaged by the imaging optical code reader 108 at substantially the same time as an attempt is made to scan the optical code.

Figure 4:
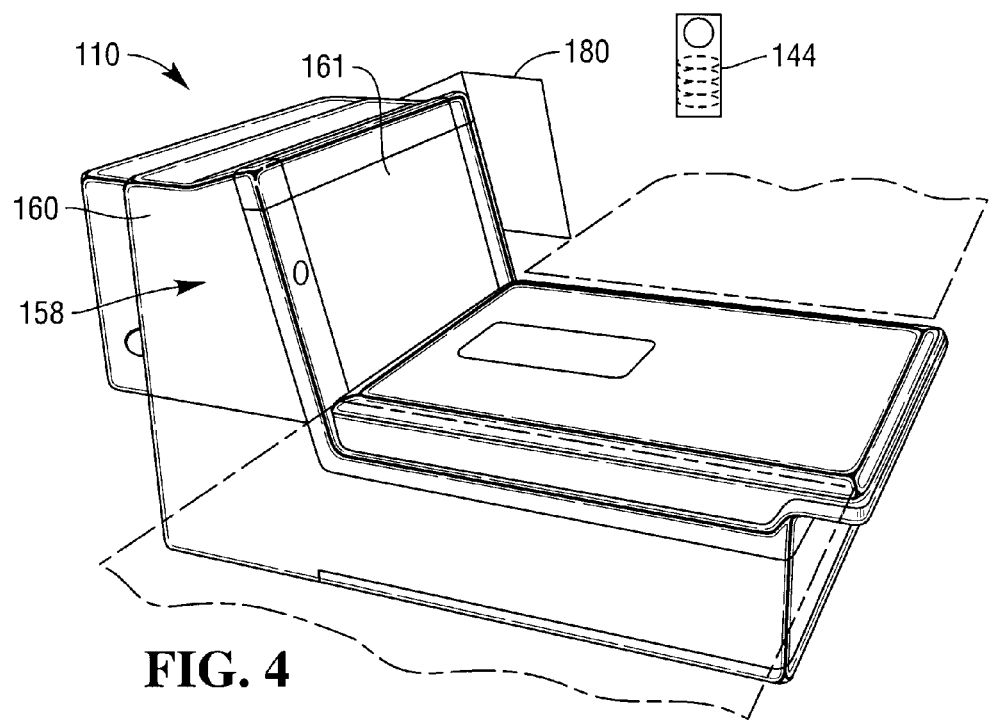
FIG. 4 is a perspective view of a second embodiment of a scanning station arranged to received the imaging optical code reader of FIG. 2.
Figure 5:
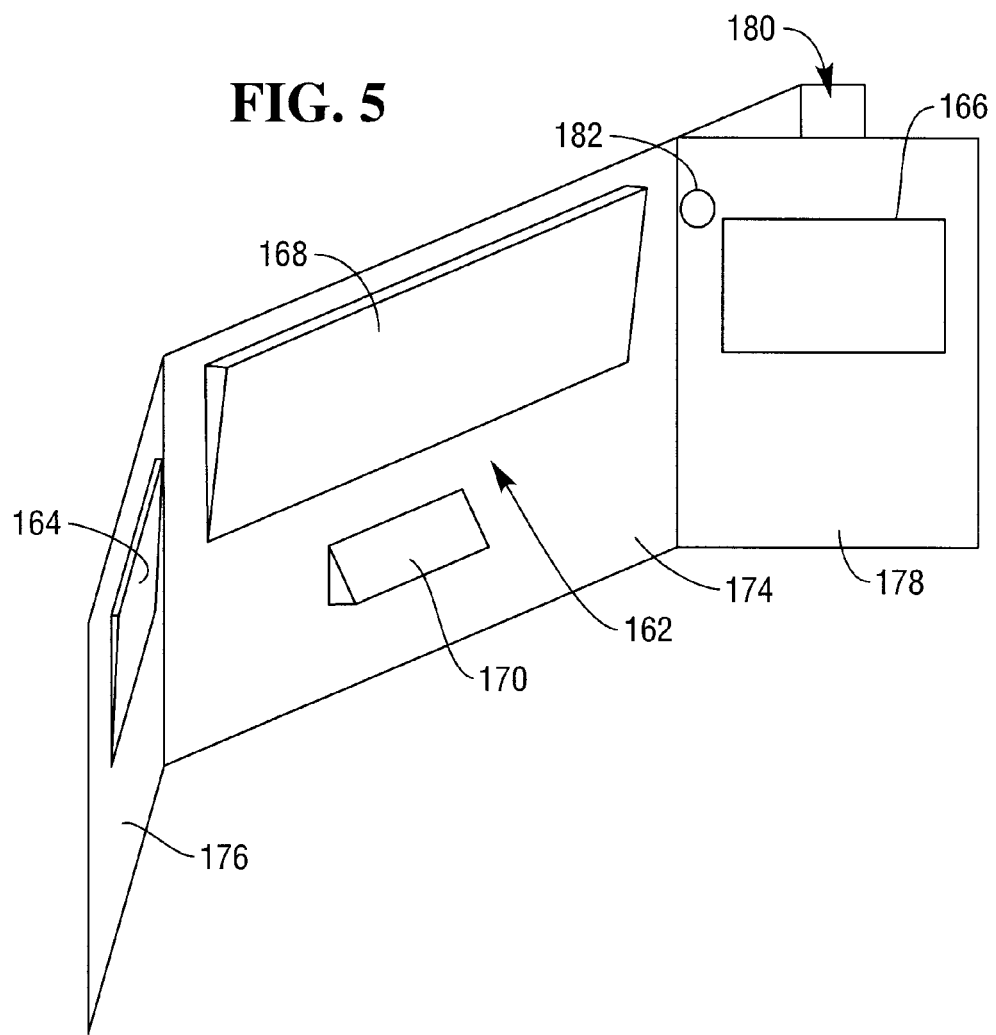
FIG. 5 is a perspective view of part of a housing and internal optics of a vertical optical tower of the scanning station of FIG. 5.

Referring now to FIGS. 4 and 5, with reference to FIG. 2, in an alternative embodiment a vertical optics tower 158 of the bi-optic barcode scanner 110 comprises a housing 160, the vertical window 161 and optics 162. The optics 162 comprise pattern mirrors 164, 166, 168 and imaging mirror 170. It will be appreciated that the vertical window 161 of the present embodiment corresponds to the vertical window 148 of the embodiment described herein before with reference to FIG. 3.

The housing 160 comprises a rear wall 174 opposite the vertical window 161 and respective side walls 176, 178 which extend from the rear wall 174 to meet a face containing the vertical window 161 and receiving cradle 180 adjacent the window 161 which is arranged to receive the imaging optical code reader 108.

The side pattern mirrors 164, 166 are mounted on respective side walls 176, 178 of the housing 160. The rear pattern mirror 168 is mounted on the rear wall 180 of the housing 160. The pattern mirrors 164, 166, 168 act to direct light from a light source of the barcode scanner 110 through the vertical window 161 into the scan volume of the barcode scanner 110. The imaging mirror 170 is positioned below the rear pattern mirror 168, out of the path of light from the light source and is directed towards the scan volume of the barcode scanner 110.

A window 182 passes through the housing adjacent the cradle 180 such that there is a line of sight between the window 182 and the imaging mirror 170, typically, but not essentially, this line of sigh passes between the side pattern mirror 166 and the rear pattern mirror 168. The cradle 180 receives the imaging optical code reader 108 such that the side window 128 of the imaging optical code reader 108 has a filed of view which includes the window 182. The orientation of the imaging optical code reader 108 in the cradle 180 is such that the field of view of the imaging optical code reader 108 in the second configuration is aligned with the line of sight between the imaging mirror 170 and the window 182. Thus, the imaging optical code reader 108 has sight of the same scanning volume as the vertical window 161 of the barcode scanner 110. Typically, the imaging mirror 170 in the fixed scanner transmits the optical path of the imaging scanner 108 and the illumination light of the imaging scanner 108.

It will be appreciated that the window 182 can be in either side wall 176, 178 of the housing 160 dependent upon which side of the housing 160 the cradle 180 present.

It will be further appreciated that the cradle 180 will typically comprise a charging connection to recharge the power supply of the imaging optical code reader as described with reference to the embodiment of FIG. 3.

It will be still further appreciated that the wireless transceiver of the imaging optical code reader communicates with a receiver of the scanning station as described with reference to the embodiment of FIG. 3.

Referring now to FIG. 6 with reference to FIG. 2, a second embodiment of a beam deflector mechanism 200 comprises a motor 202, a pivot shaft 204, and a plane mirror 206.

The motor 202 derives it power from the rechargeable power supply 120 of the imaging optical code reader 108 in response to an actuation signal and is coupled to pivot shaft 204 via a gearing arrangement 208, or via a direct coupling. The motor 202 drives the pivot shaft 204, and consequently the mirror 206, between the first and second configurations described in relation to FIG. 2 hereinbefore. Furthermore, the inertia of the motor 202 and gearing arrangement 208 acts to prevent the mirror 206 from slipping from its set configuration during use. The motor 202 is actuated by an actuation signal, such an actuation signal may come from a contact switch attached to the base or a side of the housing 112 which indicated whether the imaging optical code reader 108 is located in a cradle of the barcode reader 110 or not, and drives the mirror 206 to the appropriate configuration. Alternatively, the motor 202 can be actuated when the charging connector of the imaging optical code reader 108 is connected to its compliment in a cradle of the barcode reader 110.

Referring now to FIG. 7 with reference to FIG. 2, a third embodiment of a beam deflector mechanism 300 comprises an elongate member 302, a pivot shaft 304, a spring 306 and a plane mirror 308.

The elongate member 302 is attached to the pivot shaft 304 via a crank 310. The member 302 runs adjacent to, and parallel with, the side wall 114 of the housing 120 which is opposite the window 118. The member 302 projects through an opening in the end face 126 opposite the window 120.

In the first configuration, the spring 306 biases the mirror 308 such that the mirror lies out of the optical path between the window 120 and the image capture device 106, thus allowing the image capture device 106 to capture an image of the field of view defined by the window 120.

In the second configuration, the member 302 abuts a basal portion of the scanning station 102 and is forced upward. The upward motion of the member 302 drives the crank 310 which in turn biases the pivot shaft 304, and consequently the mirror 308, to overcome the bias of the spring 306. As the member 302 moves upward the mirror 308 rotates about the pivot shaft 304 into the second configuration.

It will be appreciated the beam deflector mechanisms of FIGS. 6 and 7 are alternatives to that described with reference to FIG. 2.

In a further embodiment, an electrically activated element changes which window the image capture device views. This is achieved by the electrically activate element lying in the optical paths from the windows and changing from transmissive to reflective, or vice versa, upon the application of a voltage. This acts in a similar manner to moving a mirror in and out of the optical paths as described with reference to FIG. 2. Typically, the electrically activated element is 95% reflective, or better, in a first arrangement and 95% transmissive, or better, in a second arrangement.

Referring now to FIG. 8, a method of operating an imaging scanner in a hand-held configuration and in a fixed configuration comprises engaging an optically active element to allow light passing through a first window to be incident up an image capture device in the hand-held configuration and to allow light passing through a second window to be incident upon the image capture device in the fixed configuration (Step 400).

In one embodiment the method comprises moving a mirror element between first and second positions.

It will be appreciated that although described with reference to a bi-optic barcode scanner the present invention is applicable to mono-optic, single window, barcode scanners.

It will also be appreciated that although described with reference to a retail checkout terminal the present invention is applicable to any terminal, assisted or self-service, where scanning and imaging of a optical codes are used, non-limiting examples of such terminals include: travel check-in terminals, medical check-in terminals, hospitality check-in/check-out terminals, for example in a hotel, a video, DVD, multi-media, mpeg3 etc sales/rental kiosk, a lottery kiosk, a postal services machine and automated teller machines (ATMs).

Various modifications may be made to the above described embodiments without departing from the spirit and the scope of the invention.

The invention claimed is:

1. An imaging optical code reader operable for reading codes in both a hand-held configuration and in a fixed configuration when coupled to a fixed code reader, the imaging optical code reader comprising:
   an image capture device;
   first and second windows; and
   an optically active element arranged to allow light passing through the first window to be incident upon the image capture device in the hand-held configuration and being further arranged to allow light directed through the second window by the fixed code reader from a common scan volume shared by the fixed code reader and the imaging optical code reader to be incident upon the image capture device in the fixed configuration, wherein the common scan volume is shared by the fixed code reader and the imaging optical code reader when the optically active element places the imaging optical code reader in the fixed configuration.

2. An imaging optical code reader according to claim 1, wherein the optically active element is arranged to move between first and second positions.

3. An imaging optical code reader according to claim 2, in which in the first position the optically active element is arranged to direct light passing through the first window on to the image capture device and in the second position the optically active element is arranged to direct light passing through the second window on to the image capture device.

4. An imaging optical code reader according to claim 2, in which in the first position the optically active element is arranged to direct light passing through the first window on to the image capture device in the hand-held configuration and in the second position the optically element is arranged to lie out of the path of light passing through the first window in the fixed configuration, thereby allowing light passing through the second window to be incident upon the image capture device.

5. An imaging optical code reader according to claim 2, in which in the first position the optically active element is arranged to direct light passing through the second window on to the image capture device in the fixed configuration and in the second position the optically element is arranged to lie out of the path of light passing through the second window in the hand-held configuration, thereby allowing light passing through the first window to be incident upon the image capture device.

6. An imaging optical code reader according to claim 2 wherein, the optically active element is arranged to move between said first and second positions by a biasing mechanism.

7. An imaging optical code reader according to claim 6 wherein, the biasing mechanism comprises a spring arranged to bias the optically active element to the first position.

8. An imaging optical code reader according to claim 6 wherein, the biasing mechanism comprises a first magnet located in a body of the imaging scanner and a complimentary second magnet located in a receiving portion of a scanning station which is arranged to receive the imaging scanner, the first and second magnets being arranged to cooperate to bias the optically active element to the second position.

9. An imaging optical code reader according to claim 1 wherein, the optically active element comprises a mirror.

10. An imaging optical code reader according to claim 1 wherein, the first and second windows are mutually orthogonal.

11. An imaging optical code reader according to claim 1 wherein, the imaging scanner comprises a wireless transceiver arranged to transmit data corresponding to the output of the image capture device to a receiving portion of a scanning station.

12. An imaging optical code reader according to claim 11, wherein the wireless transceiver utilises any one of the following data transmission techniques: Bluetooth, NFC, RFID.

13. A scanning station comprising a fixed optical code scanner and a receiving portion arranged to receive an imaging scanner, wherein the imaging scanner is operable in a hand-held configuration and in a fixed configuration coupled to the fixed optical code scanner, wherein the fixed optical code scanner and the imaging scanner sharing a common scan volume when the imaging scanner is operating in the fixed configuration, the image scanner including
    an image capture device;
    first and second windows; and
    an optically active element arranged to allow light passing through the first window to be incident upon the image capture device for code reading in the hand-held configuration and being further arranged to allow light from the common scan volume and directed through the second window by the fixed optical code scanner to be incident upon the image capture device for code reading in the fixed configuration, wherein the common scan volume is shared by the fixed optical code reader and the imaging scanner when the optically active element places the imaging scanner in the fixed configuration.

14. A scanning station according to claim 13 comprising a magnet arranged to cooperate with a complimentary magnet located on the imaging scanner.

15. A scanning station according to claim 13 wherein, the receiving portion is arranged to retain the imaging scanner such that the second window of the imaging scanner is directed towards a scan volume of the fixed optical code scanner.

16. A scanning station according to claim 15 wherein, the receiving portion is arranged to align the second window with an opening in a housing of the fixed optical code scanner, and the opening lies in an optical path between the second window and a window of the fixed optical code scanner.

17. A scanning station according to claim 16 wherein, the fixed optical code scanner comprises an imaging mirror in the optical path and arranged to direct light passing through the window of the fixed optical code scanner through the opening and the second window.

18. A scanning station according to claim 13 wherein, the optical code scanning station comprises a wireless transceiver arranged to communicate with a transceiver of the imaging scanner.

19. A method of operating an imaging scanner for reading codes in a hand-held configuration and in a fixed configuration when coupled to a fixed optical code reader comprising:
    engaging an optically active element to allow light passing through a first window to be incident up an image capture device when code reading in the hand-held configuration and to allow light directed through a second window by the fixed optical code reader from a common scan volume shared by the fixed optical code reader and the imaging scanner to be incident upon the image capture device when code reading in the fixed configuration; wherein the common scan volume is shared by the fixed optical code reader and the imaging scanner when the optically active element places the imaging scanner in the fixed configuration; and
    decoding the codes using the imaging scanner.

20. The method of claim 19, comprising moving a mirror element between first and second positions.

* * * * *